United States Patent
Okada et al.

(10) Patent No.: US 8,582,161 B2
(45) Date of Patent: Nov. 12, 2013

(54) IMAGE FORMING APPARATUS, AND COMPUTER PROGRAM PRODUCT FOR IMAGE FORMING PROVIDED WITH MANAGING LOG OF A TIME DESIGNATED PRINT JOB

(75) Inventors: Daisuke Okada, Kanagawa (JP); Noboru Tamura, Kanagawa (JP); Nobuhiro Shindo, Tokyo (JP); Hideaki Matsui, Kanagawa (JP); Hajime Kubota, Kanagawa (JP); Yuto Shibata, Kanagawa (JP); Takeo Momose, Tokyo (JP); Masahiro Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 13/137,297

(22) Filed: Aug. 4, 2011

(65) Prior Publication Data

US 2012/0033251 A1    Feb. 9, 2012

(30) Foreign Application Priority Data

Aug. 4, 2010   (JP) ................................. 2010-175799

(51) Int. Cl.
  *G06F 3/12*      (2006.01)
  *G06K 15/02*   (2006.01)

(52) U.S. Cl.
  USPC ........................................ 358/1.15; 358/1.13

(58) Field of Classification Search
  USPC ......... 358/1.1, 1.9, 1.13, 1.14, 1.15; 709/203, 709/220, 223, 224, 246; 726/22
  See application file for complete search history.

(56) References Cited

U.S. PATENT DOCUMENTS

| | | | | |
|---|---|---|---|---|
| 8,074,216 | B2 * | 12/2011 | Tamura | 717/174 |
| 2008/0074683 | A1 * | 3/2008 | Yanamura et al. | 358/1.2 |
| 2011/0279859 | A1 * | 11/2011 | Hashimoto | 358/1.15 |

FOREIGN PATENT DOCUMENTS

| | | |
|---|---|---|
| JP | 08099451 | 4/1996 |
| JP | 11175288 A | 7/1999 |
| JP | 2006229499 A | 8/2006 |

* cited by examiner

*Primary Examiner* — Gabriel Garcia
(74) *Attorney, Agent, or Firm* — Harness, Dickey & Pierce, P.L.C.

(57) ABSTRACT

An image forming apparatus includes a receiving unit; a data saving unit; a drawing data generating unit; a log storage unit that stores a processing log; an image forming unit; and a data management unit. The data management unit, when the print job is analyzed as a time designated print job; causes the data generating unit to generate the drawing data; causes the data saving unit to save the drawing data; that, when analyzed printing being enabled at the designated print time, causes the image forming unit to perform image formation based on the drawing data and causes the log storage unit to store therein a processing log; and that, when printing is analyzed as disabled at the designated print time, performs processing corresponding to a print disabled state preset and causes the log storage unit to store therein a processing log about the processing.

6 Claims, 8 Drawing Sheets

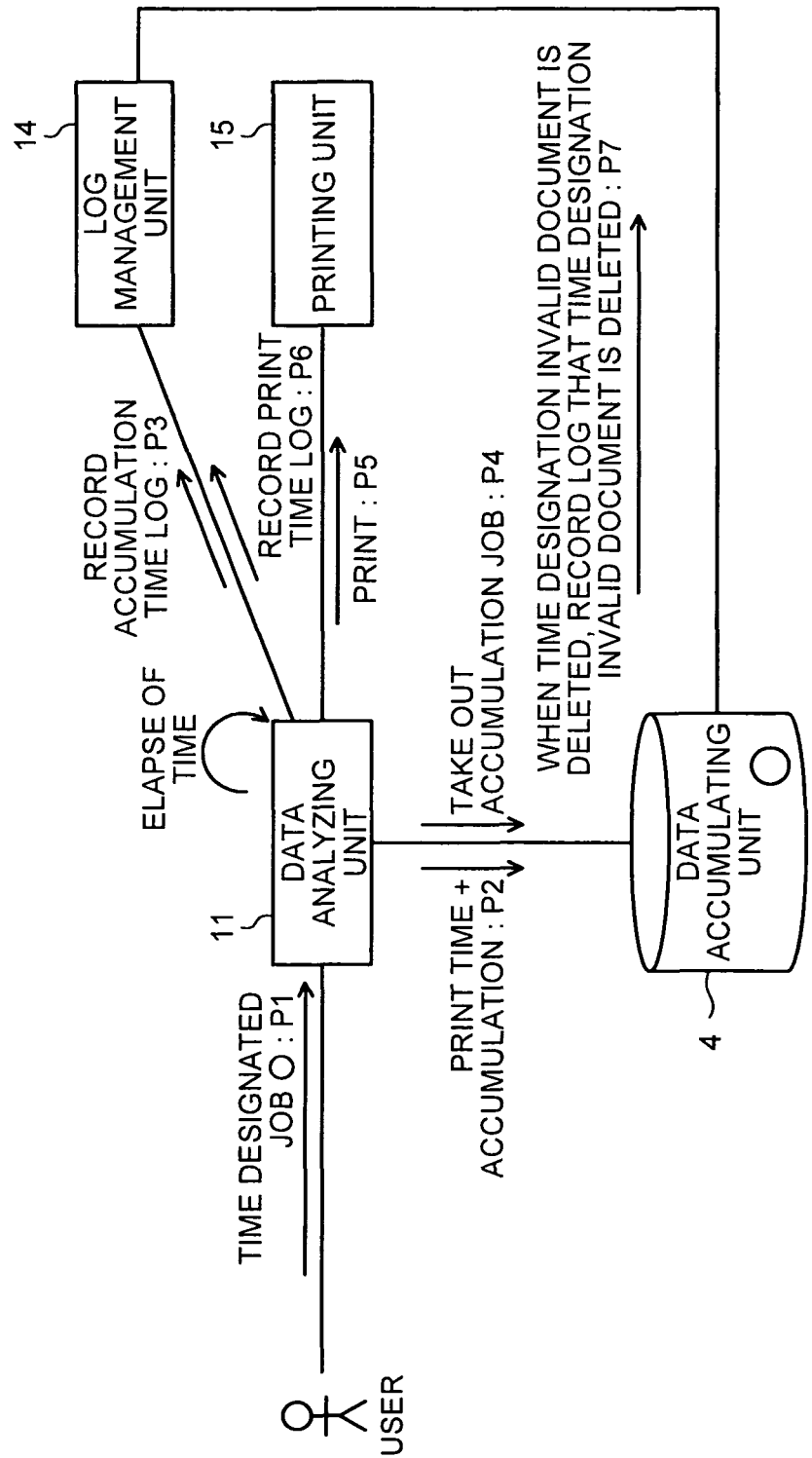

FIG.3

```
LOG INFORMATION
ACCUMULATION TIME LOG
 ·RESULT: ACCUMULATION SUCCESSFUL
 ·DOCUMENT NAME: aaa. txt
 ·DOCUMENT TYPE: TIME DESIGNATED DOCUMENT
 ·ACCUMULATION TIME: 2010/5/10 19:00
 ·DESIGNATED TIME SETTING: 2010/5/11 05:00

PRINT TIME LOG
 ·RESULT: PRINT SUCCESSFUL
 ·DOCUMENT NAME: aaa. txt
 ·DOCUMENT TYPE: TIME DESIGNATED DOCUMENT
 ·PRINT TIME: 2010/5/11 05:00
```

FIG.4

```
LOG INFORMATION
ACCUMULATION TIME LOG
 ·RESULT: ACCUMULATION SUCCESSFUL
 ·DOCUMENT NAME: aaa. txt
 ·DOCUMENT TYPE: TIME DESIGNATED DOCUMENT
 ·ACCUMULATION TIME: 2010/5/10 19:00
 ·DESIGNATED TIME SETTING: 2010/5/11 05:00

DELETION TIME LOG
 ·RESULT: DOCUMENT DELETED DOCUMENT
 ·REASON: DELETION BECAUSE 24 HOURS HAVE PASSED SINCE
  TIME DESIGNATION IS MADE INVALID
 ·DOCUMENT NAME: aaa. txt
 ·DOCUMENT TYPE: TIME DESIGNATION INVALID DOCUMENT
 ·DELETION TIME: 2010/5/12 05:00
```

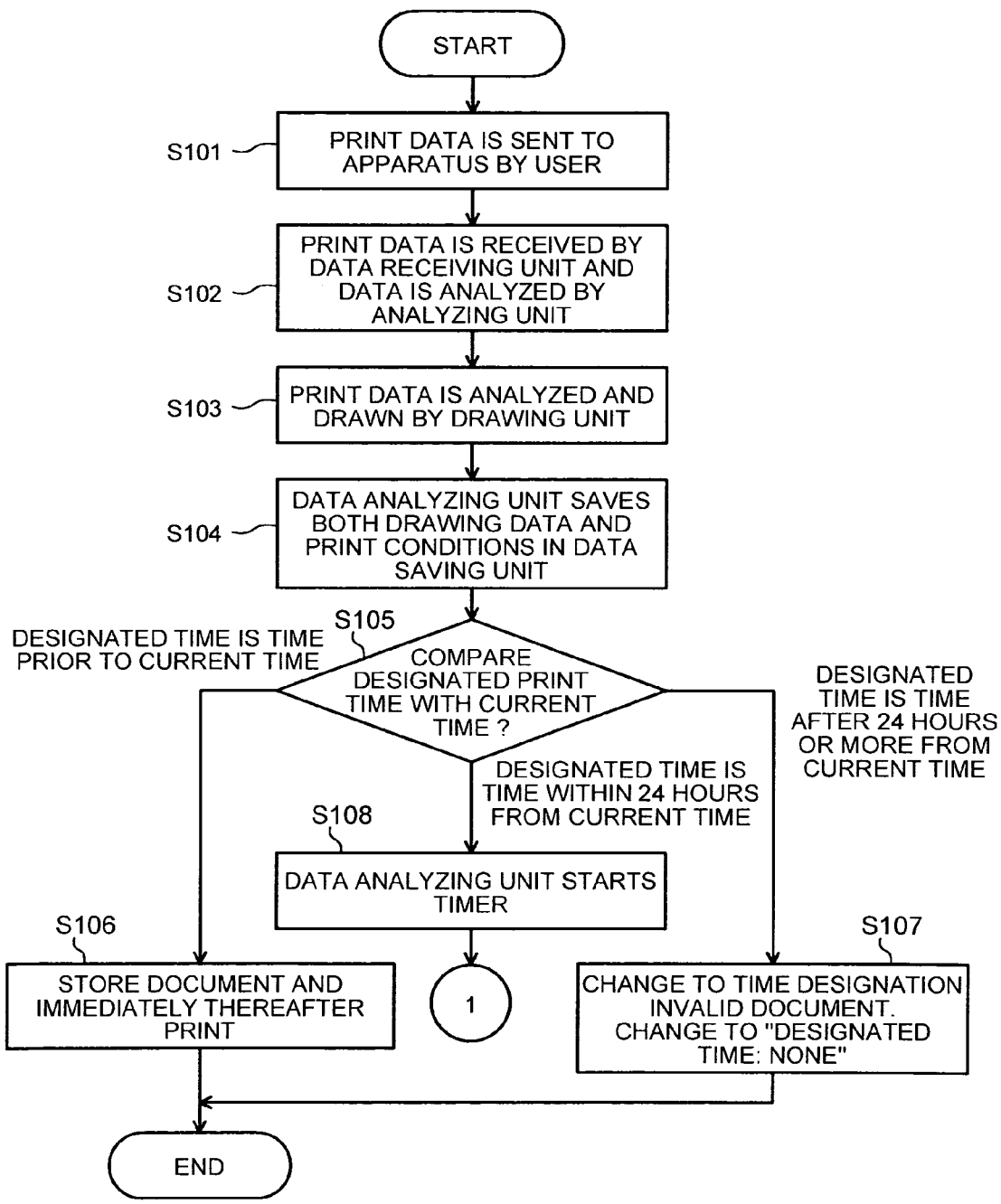

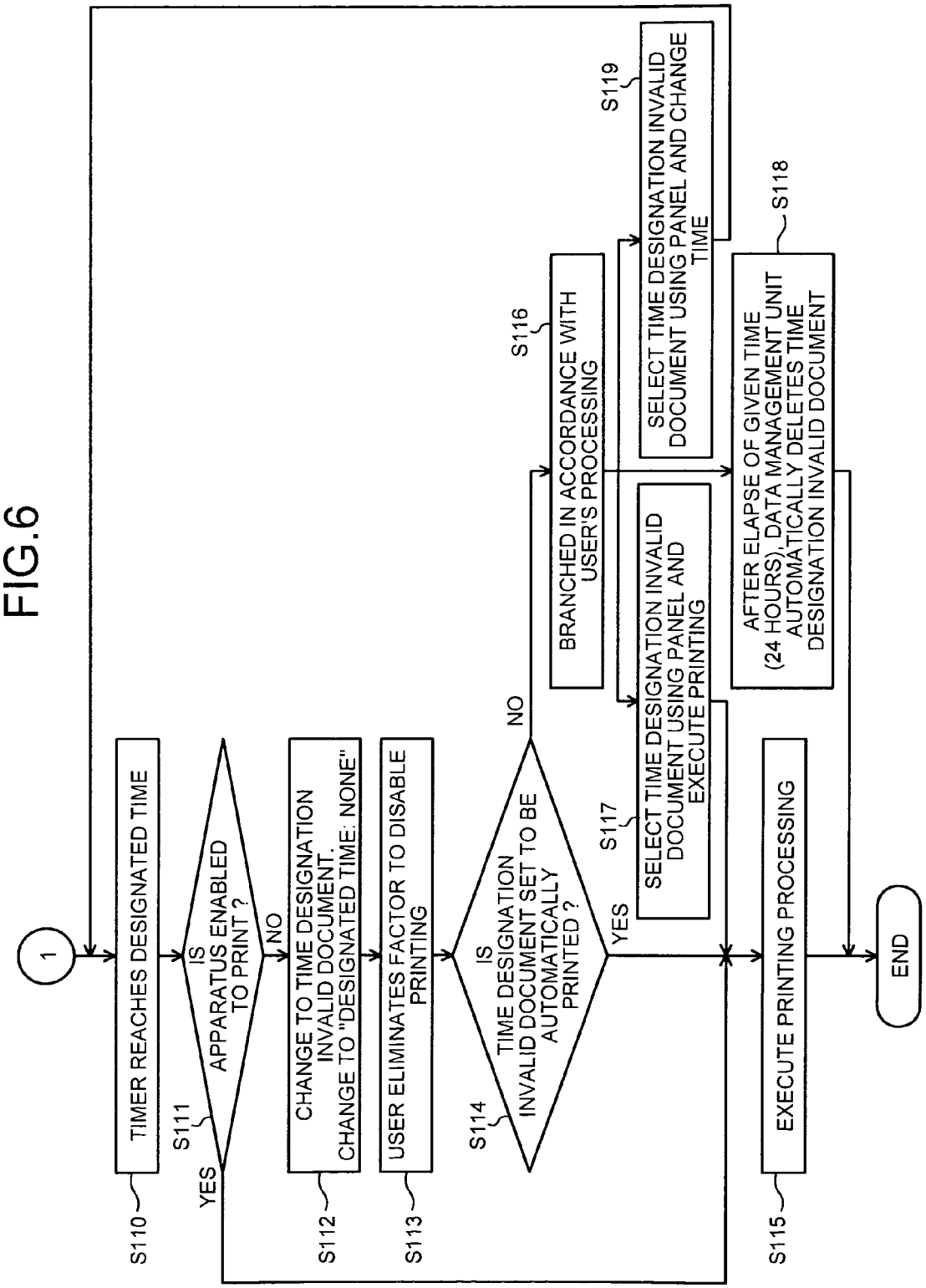

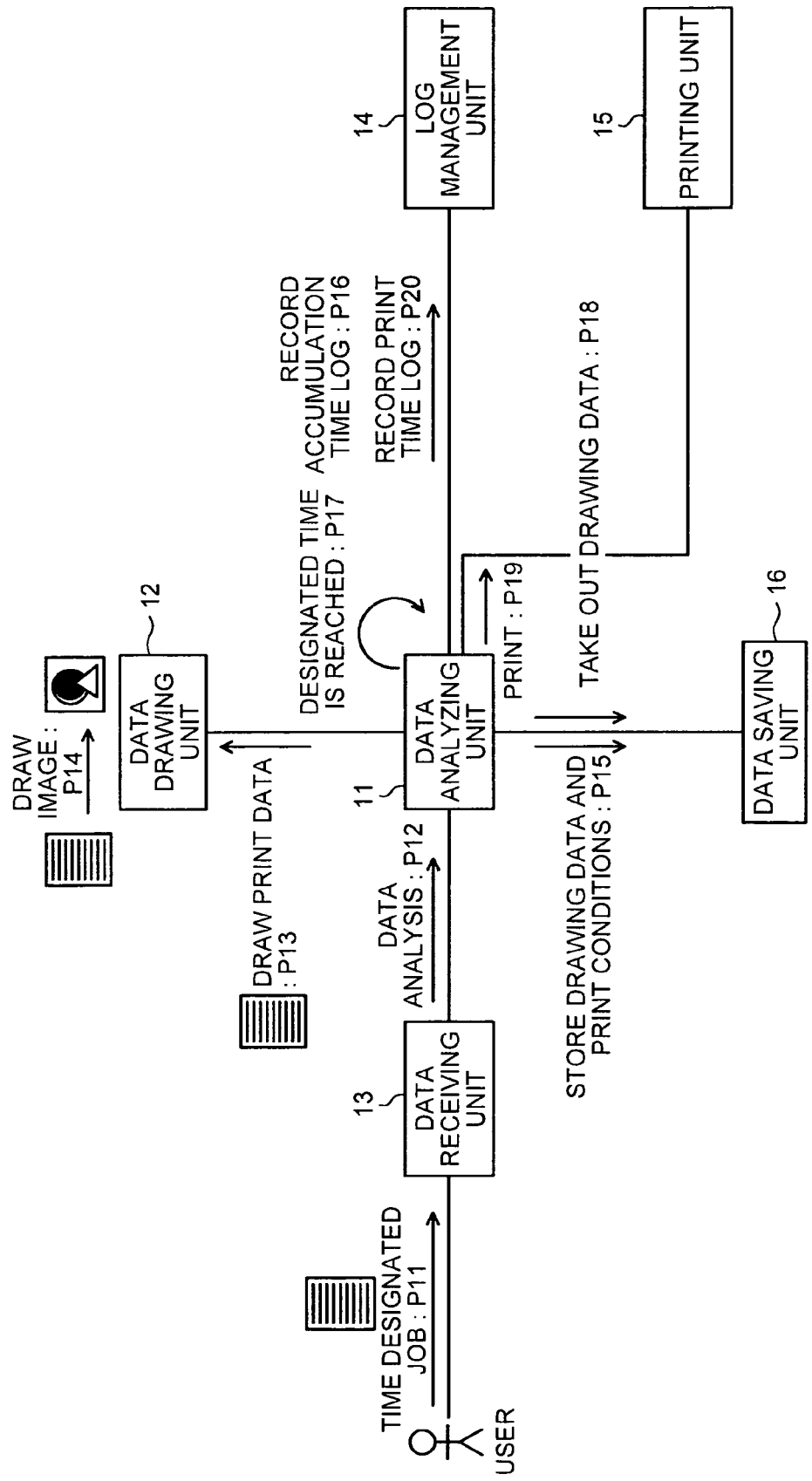

IMAGE FORMING APPARATUS, AND COMPUTER PROGRAM PRODUCT FOR IMAGE FORMING PROVIDED WITH MANAGING LOG OF A TIME DESIGNATED PRINT JOB

CROSS-REFERENCE TO RELATED APPLICATIONS

The present application claims priority to and incorporates by reference the entire contents of Japanese Patent Application No. 2010-175799 filed in Japan on Aug. 4, 2010.

BACKGROUND OF THE INVENTION

1. Field of the Invention

Present invention relates to an image forming apparatus, and computer program product for image forming and, more particularly, to an image forming apparatus, and computer program product for image forming provided with managing log of a time designated print job.

2. Description of the Related Art

In recent years, with the spread of networking, an image forming apparatus on a network has often been shared by a plurality of host apparatuses. When the plurality of host apparatuses share the image forming apparatus, improving efficiency in use of the image forming apparatus is important.

Conventionally, there is an image forming apparatus in which when a host apparatus inputs a print job into the image forming apparatus, a print time is designated and the print job is printed by the image forming apparatus at the designated printing time.

In the image forming apparatus in which a print time can be designated in this manner, as illustrated in FIG. 9, when a time designated print job is received, a data analyzing unit 101 analyzes the job and accumulates the print time and print data in a data accumulating unit 102. When the designated print time comes, the data analyzing unit 101 reads out the time designated print job from the data accumulating unit 102 and causes a printing unit 103 to execute printing processing.

Japanese Patent Application Laid-open No. 2006-229499 describes that since a large volume of printing during business hours disturbs other users' operations in a company or the like, a print time for a time designated print is designated to midnight when few user is present or to an off time such as a lunch time when few users are present so as not to disturb other operations. In addition, printing in midnight or the like when electricity costs low may reduce TCO (total cost of ownership).

However, since the conventional time designated printing described above only performs printing processing by executing a print job at a designated time, needed is to ensure security of the print job of the time designated print. That is, since the time designated print is often performed when few is present, there are cases where a printed document as a processing result of the print job may be taken away by a third party or printing may be disabled because of a print error and the like. Therefore, it has been demanded to ensure the security of a print job at a designated time.

SUMMARY OF THE INVENTION

It is an object of the present invention to at least partially solve the problems in the conventional technology.

According to an aspect of the present invention, there is provided an image forming apparatus that includes a receiving unit that receives a print job; a data saving unit that saves data therein; a drawing data generating unit that generates drawing data from print data of the print job; a log storage unit that stores a processing log for the print job; an image forming unit that forms an image on a recording medium based on the drawing data; and a data management unit that, when the print job received by the receiving unit is analyzed to be a time designated print job; causes the data generating unit to generate the drawing data; causes the data saving unit to save the drawing data in a manner correlated with print conditions such as a designated print time acquired from the print job and the drawing data; and manages the designated print time; that, when analyzed that printing is enabled at the designated print time, causes the image forming unit to perform image formation based on the drawing data at the designated print time and causes the log storage unit to store therein a processing log about processing of the image formation; and that, when printing is analyzed to be disabled at the designated print time, performs processing corresponding to a print disabled state preset for the time designated print job and causes the log storage unit to store therein a processing log about the processing corresponding to the print disabled state.

According to another aspect of the present invention, there is provided a computer program product including a non-transitory computer-usable medium having computer-readable program codes embodied in the medium for image forming in an image forming apparatus, and the program codes when executed causing a computer to execute: receiving a print job; generating drawing data from print data of the print job; image forming that includes forming image based on the drawing data onto a recording medium; and data managing that includes, causing, when the print job received at the receiving is analyzed to be a time designated print job, generating the drawing data, causing a data saving unit to save the drawing data in a manner correlated with print conditions such as a designated print time acquired from the print job and the drawing data, and managing the designated print time; causing, when analyzed that printing is enabled at the designated print time, an image forming unit to perform image formation based on the drawing data at the designated print time and causing the log storage unit to store therein a processing log about processing of the image formation; and performing, when printing is analyzed to be disabled at the designated print time, processing corresponding to a print disabled state preset for the time designated print job and causing a log storage unit to store therein a processing log about the processing corresponding to the print disabled state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram of the whole processing flow in a time designated print job;

FIG. 3 is a diagram of an example of normal-time log information;

FIG. 4 is a diagram of an example of log information when a time designation invalid document is deleted;

FIG. 5 is a flowchart of job processing in the time designated print job;

FIG. 6 is a flowchart of processing continued from FIG. 5;

FIG. 7 is a diagram of a processing flow of the time designated print job at a normal time;

DETAILED DESCRIPTION OF THE PREFERRED EMBODIMENTS

Preferred embodiments will be described below in detail with reference to the accompanying drawings. It should be noted that the embodiments described below are the preferred embodiments and various technically desirable limitations are added thereto, but the scope of the present invention is not unduly limited to the description below. Furthermore, every structural element described in the present embodiments may not be indispensable to the embodiments.

First Embodiment

Figure 1:
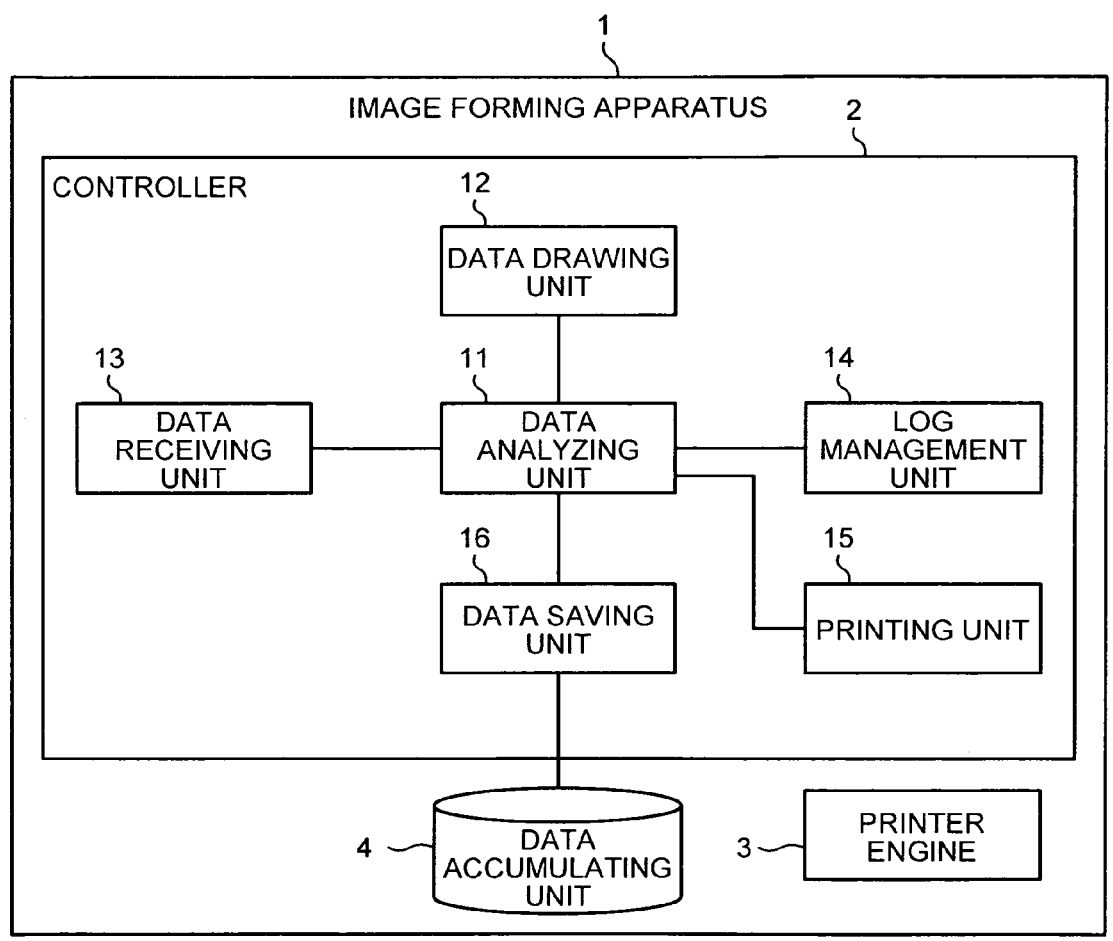
FIG. 1 is a block diagram of relevant portions of an image forming apparatus according to an embodiment.

FIGS. 1 to 8 are diagrams of embodiments of an image forming apparatus, and a computer program product for image forming. FIG. 1 is a block diagram of relevant portions of this image forming apparatus 1 where one embodiment of the image forming apparatus, and a computer program product for image forming is applied thereto.

The image forming apparatus 1 of FIG. 1 includes a controller 2, a printer engine 3, a hard disk 4 (or a data accumulating unit), and the like and also includes an operation display unit (not-illustrated) and the like. The controller includes a data analyzing unit 11, a data drawing unit 12, a data receiving unit 13, a log management unit 14, a printing unit 15 and a data saving unit 16 and the like.

In the operation display unit (setting unit), various commands necessary to use the image forming apparatus 1 are input; particularly various settings for a time designated print that is described below are input; and also various information to notify a user from the image forming apparatus 1 are displayed on a display unit.

As the printer engine (image forming unit) 3, for example, an electrophotography printer engine is used, which includes every necessary portion for an electrophotography image forming such as a photosensitive element, an optical writing unit, a developing unit, a charging unit, a neutralization unit, and a cleaning unit. A writing unit causes the optical writing unit to operate with drawing data and a control signal and forms an electrostatic latent image on the photosensitive element, while the developing unit supplies toner to the photosensitive element and develops the electrostatic latent image on the photosensitive element to form a toner image. The writing unit feeds a sheet of paper from a paper feeding unit between the photosensitive element and a transferring unit, transfers the toner image on the photosensitive element to the sheet of paper, conveys the sheet of paper having the toner image transferred thereto to a fixing unit, fixes the toner image on the sheet of paper with heat and pressure at the fixing unit and forms an image.

A data accumulating unit (data saving unit) 4 stores, under control of the controller 2, various data particularly image data of a time designated print job, print information and the like and also stores a log of the time designated print job.

The data receiving unit (receiving unit) 13 is connected through a network such as a local area network (LAN) to a host apparatus such as a computer, giving and receiving data and commands to/from the host apparatus. Particularly, the data receiving unit 13 receives a print job, particularly the time designated print job through the network and gives the received print job to the data analyzing unit 11.

The data analyzing unit (data management unit) 11 analyzes print data for the print job and print setting information and demands the data drawing unit 12 to draw the print data.

The data drawing unit (drawing data generating unit) 12 converts the print data based on an analysis result of the data analyzing unit 11 to drawing data, which is loaded in a memory.

The data analyzing unit 11 saves an image (drawing data) drawn by the data drawing unit 12 in a manner correlated with print conditions (print setting information) accompanied by the print data through the data saving unit 16 in the data accumulating unit 4. When the print job is the time designated print, the print conditions include a designated print time.

The data analyzing unit 11 records log information, the log information being about when the drawing data is accumulated through the data saving unit 16 into the data accumulating unit 4, into the log management unit (log storage unit) 14.

The data analyzing unit 11 compares a time of a designated time setting for a time designated to print document in the log information with a current time clocked by a built-in time mechanism (not-illustrated) and, when the current time reaches the designated time, reads out through the data saving unit 16 from the data accumulating unit 4 the drawing data of the time designated print document and the print conditions correlated with the drawing data, which are given to the printing unit 15 and printed under control of the printer engine 3 by the printing unit 15.

The data analyzing unit 11 acquires log information from the printing unit 15 and records the log information into the log management unit 14, the log information being about when the time designated print document is printed.

Furthermore, the data analyzing unit 11 compares a time of the designated time setting for the time designated print document in the log information with the current time clocked by the built-in time mechanism (not-illustrated). When the current time reaches the designated time and print output is tried but failed because of a power-off, an occurrence of a sheet jam or the like; the data analyzing unit 11 generates a log about a failed print, which is recorded in the log management unit 14.

Next, operations of the present embodiment will be described. The image forming apparatus 1 of the present embodiment properly records log information that can track a processing result of a time designated print document.

That is, FIG. 2 illustrates the whole processing flow of a print job for a time designated print (time designated print job) in the image forming apparatus 1. As shown, a user sends the time designated print job from the host apparatus (P1), which is received by the data receiving unit 13 in the controller 2 and given to the data analyzing unit 11; the data analyzing unit 11 analyzes print data of the print job and print setting information and demands the data drawing unit 12 to draw the print data. The data drawing unit 12 converts the print data based on an analysis result of the data analyzing unit 11 into drawing data which is then loaded into a memory. The data analyzing unit 11 saves an image (drawing data) drawn by the data drawing unit 12 in a manner correlated with print conditions (print setting information) accompanied by the print data, particularly with a print time, into the data accumulating unit 4 (P2) through the data saving unit 16. Furthermore, when the print job is accumulated in the data accumulating unit 4 in a manner correlated with the print time, the data analyzing unit 11 generates an accumulation time log, which is recorded in the log management unit 14 (P3).

Accumulation time log information about when the data analyzing unit 11 accumulates the print job in the data accumulating unit 4 includes, as illustrated as an "accumulation time log" in normal-time log information of FIG. 3 and in deletion information about a time designation invalid document of FIG. 4, "accumulation result": accumulation successful, "document name": aaa.txt, "document type": time designated print document, "accumulation time": 2010/5/10 19:00, and "designated time setting": 2010/5/11 05:00 and the like.

The data analyzing unit 11 compares a time of the designated time setting for the time designated print document in the log information with the current time clocked by the built-in time mechanism (not-illustrated); determines whether the current time reaches the designated time; and, when the current time reaches the designated time, reads out through the data saving unit 16 from the data accumulating unit 4 the drawing data of the time designated print document (time designated print job) and the print conditions correlated with the drawing data (P4), which are then given to the printing unit 15 and printed under control of the printer engine 3 by the printing unit 15 (P5).

The data analyzing unit 11 acquires from the printing unit 15 the log information about when the time designated print document is printed, which is recorded in the log management unit 14, as a print time log of the normal-time log information illustrated in FIG. 3 (P6). The print time log of the normal-time log information of FIG. 3 includes "print result": print successful, "document name": aaa.txt, "document type": time designated print document, "print time": 2010/5/11 05:00 and the like.

The data analyzing unit 11 compares the designated time of the time designated print job in the data accumulating unit 4 with the current time clocked by the built-in time mechanism (not-illustrated). When the current time reaches the designated time and print output is tried but failed because of a power-off, an occurrence of a sheet jam or the like; the data analyzing unit 11 makes the time designated print job (time designated print document) invalid (change to a time designation invalid print document) and, after an elapse of a preset deletion waiting time (for example, 24 hours) since invalid is made, deletes the time designation invalid print job (time designation invalid document) from the data accumulating unit 4, and generates a deletion log as illustrated in FIG. 4, which is recorded in the log management unit 14 (P7). As illustrated in FIG. 4, a deletion time log in the log information about when the time designation invalid document is deleted, includes "result": document deleted, "reason": deletion because 24 hours have passed since the time designation invalid document was made, "document name": aaa.txt, "document type": time designation invalid document, "deletion time": 2010/5/12 05:00. It should be noted that the time designation invalid document is a document that is selected without a print instruction being performed and will be automatically deleted from the data accumulating unit 4 after an elapse of a preset waiting time. It is also a document that can be returned to the time designated print document or be immediately printed by again setting a time using a panel of the operation display unit.

When the time designated print job is failed to print because the image forming apparatus 1 is powered off, the data analyzing unit 11 changes the time designated print job to the time designation invalid document and sets a starting point to execute processing to delete the time designation invalid document after an elapse of the waiting time, when the image forming apparatus 1 is powered on next time.

Job processing of the above-mentioned time designated print job will be described with reference to FIG. 5. In the image forming apparatus 1, when the time designated print job (time designated print data) is transmitted from a user (step S101), the data receiving unit 13 receives the time designated print job (time designated print data), and the data analyzing unit 11 analyzes the data and demands the data drawing unit 12 to draw the data (step S102).

The data drawing unit analyzes print data to draw an image (step S103) and the data analyzing unit 11 accumulates the image (drawing data) drawn by the data drawing unit 12 in a manner correlated with print conditions (print setting information) accompanied by the print data, particularly in a manner correlated with a print time through the data saving unit 16 in the data accumulating unit 4 (step S104).

The data analyzing unit 11 compares a designated print time designated in the print conditions of the drawing data accumulated in the data accumulating unit 4 with the current time (step S105).

At step S105, when the designated print time is a time prior to the current time, the data analyzing unit 11 saves the document, which is immediately thereafter given to the printing unit 15, causes the printer engine 3 to print and completes the processing (step S106).

Furthermore, at step S105, when the designated time is a time after 24 hours or more from the current time, the data analyzing unit 11 changes drawing data (document) of the designated time to the time designation invalid document ("designated time": none) (step S107) and completes the processing.

Furthermore, at step S105, when the designated time is a time within 24 hours from the current time, the data analyzing unit 11 starts a timer clocking a time to the designated time (step S108) and as illustrated in FIG. 6, when the timer clocks the designated time (step S110), checks whether the image forming apparatus (device) 1 is enabled to print or not; that is, whether the power is turned on or not, whether other print jobs are being printed or not, whether a paper jam occurs or not, and the like (step S111).

When it is NO at step S111, that is, when the image forming apparatus 1 is disabled to form an image, the data analyzing unit 11 changes the print job (print document) for a print target with the time designation into invalid document (changes to "designated time: none") (step S112), and when the user eliminates a factor to disable printing (for example, the image forming apparatus 1 is turned on) (step S113), checks whether the time designation invalid document is set to be automatically printed or not (step S114).

When it is YES at step S114, that is, when the time designation invalid document is set to be automatically printed, the data analyzing unit 11 reads out from the data accumulating unit 4 the time designation invalid document, which is given through the printing unit 15 to the printer engine 3; causes the printer engine 3 to print; and completes the processing (step S115).

When it is YES at step S111, that is, when the image forming apparatus 1 is enabled to print, the data analyzing unit 11 reads out drawing data and print conditions of the time designated print document at the designated time from the data accumulating unit 4; gives the data and conditions to the printer engine 3 through the printing unit 15; causes the printer engine 3 to print; and completes the processing (step S115).

When it is NO at step S114, that is, when the time designation invalid document is not set to be automatically printed, the data analyzing unit 11 branches the processing in accordance with a user's setting (step S116). When the time designation invalid document is selected and printing execution is instructed by an operation using the panel of the operation display unit (step S117), the data analyzing unit 11 reads out the time designation invalid document from the data accumulating unit 4, the time designation invalid document being given through the printing unit 15 to the printer engine 3, causes the printer engine 3 to print and completes the processing (step S115).

If a given time preset at step S116 (deletion waiting time, for example, 24 hours) has passed, the data analyzing unit 11 deletes the time designation invalid document of which deletion waiting time has passed, from the data accumulating unit 4 and completes the processing (step S118).

Furthermore, if the time designation invalid document is selected and the time is changed through the panel of the operation display unit at step S116, the designated time for the time designation invalid document is set to be a changed time (step S119); then the procedure returns to step S110 and processing to clock a time with a timer to the designated time thus changed is started in the similar manner described above (step S110 to S119).

A processing flow when printing processing of the time designated print job is properly completed in the time designated print job processing described above can be illustrated in FIG. 7; and a processing log at the time is recorded in the log management unit 14.

That is, in the image forming apparatus 1, when the data receiving unit 13 receives a time designated print job from a user (P11), the data receiving unit 13 demands the data analyzing unit 11 to analyze the data (P12), and the data analyzing unit 11 analyzes the received print data and demands the data drawing unit 12 to draw the print data (P13). The data drawing unit 12 converts the print data based on an analysis result of the data analyzing unit 11 into drawing data, which is loaded (drawn) into a memory (P14).

The data analyzing unit 11 accumulates the drawing data drawn by the data drawing unit 12 and print conditions (print time and the like) through the data saving unit 16 into the data accumulating unit 4 (P15) and records an accumulation time log into the log management unit 14 as illustrated in FIGS. 3 and 4 (P16).

Upon confirming that the current time reaches the designated time (P17), the data analyzing unit 11 reads out the drawing data at the designated time and the print conditions which are accumulated in the data accumulating unit 4 through the data saving unit 16 (P18); causes the printer engine 3 to print through the printing unit 15 (P19); and records a log such as the print time log in the normal-time log information as illustrated in FIG. 3, in the log management unit 14 (P20).

Figure 8:
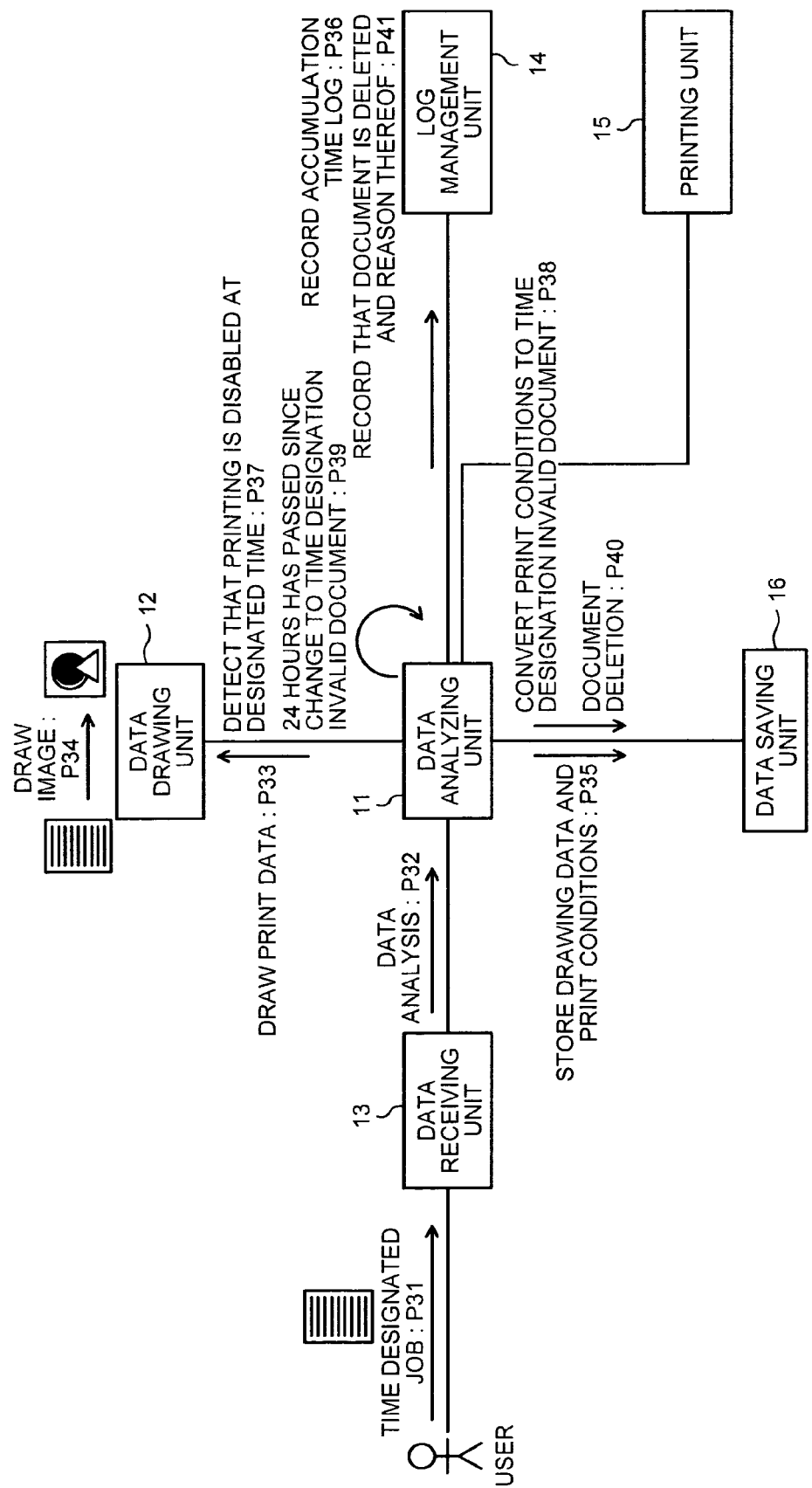
FIG. 8 is a diagram of a processing flow of the time designated print job when the designation becomes invalid.
Figure 9:
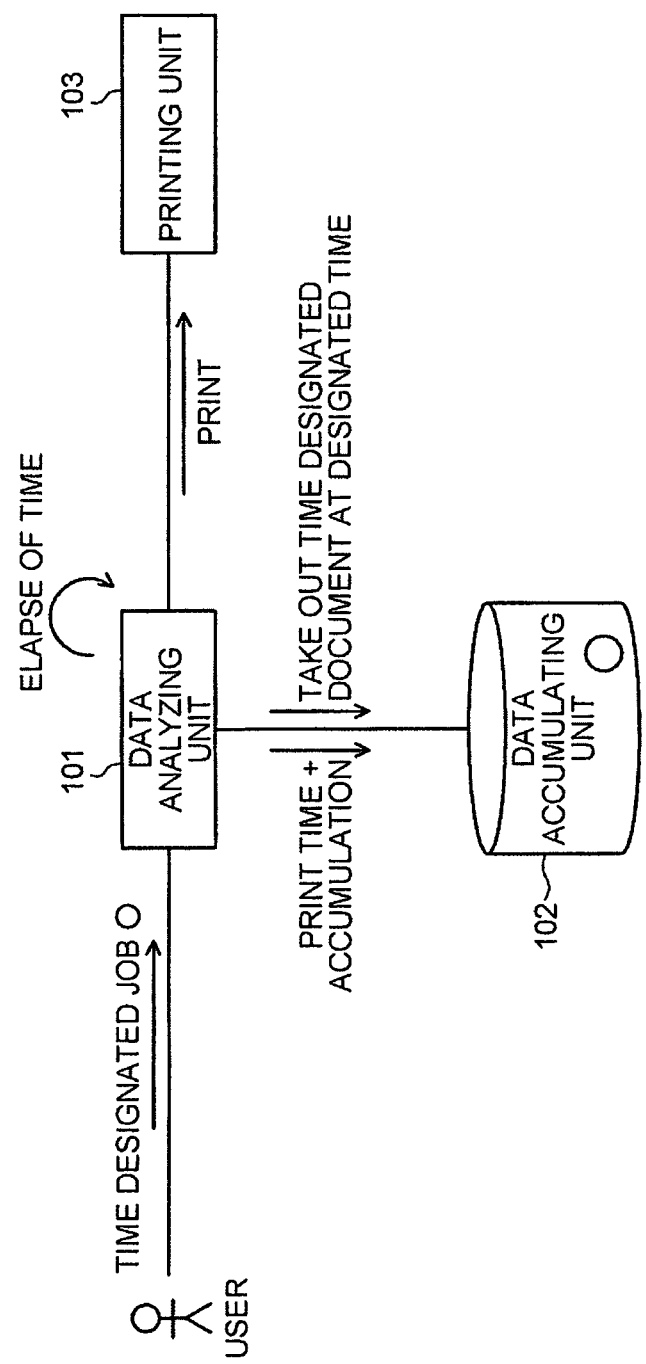
FIG. 9 is a diagram of a conventional processing flow of the time designated print job.

In the time designated print job processing described above, a processing flow when the time designated print job is failed to be properly performed and the time designation invalid document is deleted can be illustrated as in FIG. 8; and a processing log at the time is recorded in the log management unit 14.

That is, in the image forming apparatus 1, when the data receiving unit 13 receives a time designated print job from a user (P31), the data receiving unit 13 demands the data analyzing unit 11 to analyze the data (P32), and the data analyzing unit 11 analyzes received print data and demands the data drawing unit 12 to draw the print data (P33). The data drawing unit 12 converts the print data based on an analysis result of the data analyzing unit 11 to drawing data, which is loaded (drawn) into a memory (P34).

The data analyzing unit 11 accumulates the drawing data drawn by the data drawing unit 12 and the print conditions (print time and the like) into the data accumulating unit 4 through the data saving unit 16 (P35) and records an accumulation time log as illustrated in FIGS. 3 and 4 in the log management unit 14 (P36).

Upon detecting that the time designated print document of which current time reaches the designated time is disabled to print at the designated time (P37), the data analyzing unit 11 converts the print conditions of the time designated print document into a time designation invalid document (P38). In that case, in the print conditions of the time designated print document, "document type" is changed from the time designated print document to the time designation invalid document and "time" is changed, for example, from AM 5:00 to "none".

Subsequently, upon detecting that a given time (for example, 24 hours) has passed since the time designated print document was changed to the time designation invalid document (P39), the data analyzing unit 11 deletes the drawing data and the print conditions for the time designation invalid document accumulated in the data accumulating unit 4 through the data saving unit 16 (P40) and records a log of that the document is deleted and a reason thereof as a deletion time log of the log information about when the time designation invalid document is deleted as illustrated in FIG. 4 (P41).

In this way, when a received print job is analyzed by the data analyzing unit 11 to be a time designated print job, the image forming apparatus 1 of the present embodiment generates drawing data from the print job at the data drawing unit 12 and saves the drawing data in a manner correlated with print conditions such as a designated print time acquired from the print job in the data accumulating unit 4. The data analyzing unit 11 manages the designated print time and when printing is enabled at the designated print time, causes the printer engine 3 through the printing unit 15 to perform image formation based on the drawing data at the designated print time, and records a processing log of processing of the image formation in the log management unit 14. When printing is disabled at the designated print time, the data analyzing unit 11 performs processing corresponding to a print disabled state preset for the time designated print job and records the processing log about the processing corresponding to the print disabled state in the log management unit 14.

Accordingly, it is possible to keep a record of the log information about how the time designated document is processed in both cases when printing is successful and when printing is unsuccessful, and it is also possible to properly and surely know a processing result of the time designated print document, therefore, security of the time designated print job (time designated print document) can be enhanced.

Furthermore, in the image forming apparatus 1 of the present embodiment, the data analyzing unit 11 changes the time designated print job in the data accumulating unit 4 into the time designation invalid print job for making the designated print time invalid and deletes the time designation invalid print job from the data accumulating unit 4 after an elapse of a preset waiting time from the designated print time, as a processing corresponding to the print disabled state.

Accordingly, when the time designated print job is failed to print at the designated time because of a power-off of the image forming apparatus 1, an occurrence of a sheet jam or the like, it is possible to avoid the time designated print job from remaining for quite a long time in the data accumulating unit 4; to optimize processing of the time designated print job; and also to enhance efficiency in use of the data accumulating unit 4.

Furthermore, in the image forming apparatus 1 of the present embodiment, when the time designated print job is disabled to print at the designated print time because the image forming apparatus 1 is powered off, the data analyzing unit 11 sets a starting point to start the processing corresponding to the print disabled state to a time when the image forming apparatus 1 is powered on next time.

Accordingly, it is possible to avoid inappropriate job processing of the time designated print job caused by an unintended situation of a user who instructs the processing, and also it is possible to improve usability of a time designated print function.

In addition, in the image forming apparatus 1 of the present embodiment, it is possible to set a processing method of the time designation invalid print job by a user's operating the operation display unit. The data analyzing unit 11 executes the processing corresponding to a print disabled state for the time designation invalid print job in accordance with a setting of the operation display unit.

Accordingly, it is possible to execute the processing corresponding to a print disabled state that reflects the user's intention about processing of the time designation invalid print job and thereby it is possible to improve usability.

Furthermore, in the image forming apparatus 1 of the present embodiment, processing to automatically execute printing of the time designation invalid print job when print enabled state is set as the processing corresponding to a print disabled state by the data analyzing unit 11.

Accordingly, when the image forming apparatus 1 recovers to a print enabled state, it is possible to properly execute the print job, and thereby improving usability.

The present invention makes it possible to identify a processing result of a time designated print job, thereby enhancing security.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a receiving unit that receives a print job;
    a data saving unit that saves data therein;
    a drawing data generating unit that generates drawing data from print data of the print job;
    a log storage unit that stores a processing log for the print job;
    an image forming unit that forms an image on a recording medium based on the drawing data; and
    a data management unit
        that, when the print job received by the receiving unit is analyzed to be a time designated print job; causes the data generating unit to generate the drawing data; causes the data saving unit to save the drawing data in a manner correlated with print conditions such as a designated print time acquired from the print job and the drawing data; and manages the designated print time;
        that, when analyzed that printing is enabled at the designated print time,
            causes the image forming unit to perform image formation based on the drawing data at the designated print time and
            causes the log storage unit to store therein a processing log about processing of the image formation; and
        that, when printing is analyzed to be disabled at the designated print time, performs processing corresponding to a print disabled state preset for the time designated print job and causes the log storage unit to store therein a processing log about the processing corresponding to the print disabled state.

2. The image forming apparatus according to claim 1, wherein
    the data management unit, as the processing corresponding to the print disabled state,
        changes the time designated print job in the data saving unit into a time designation invalid print job that makes the designated print time invalid, and
        deletes the time designation invalid print job from the data saving unit after an elapse of a preset waiting time from the designated print time.

3. The image forming apparatus according to claim 2, wherein
    the data management unit, when the time designated print job is disabled to print at the designated print time because the image forming apparatus is powered off, sets a starting point to start the processing corresponding to the print disabled state to a time when the image forming apparatus is powered on next time.

4. The image forming apparatus according to claim 1, further comprising
    a setting unit that sets a method of processing the time designation invalid print job, wherein
    the data management unit executes the processing corresponding to the print disabled state for the time designation invalid print job in accordance with a setting performed by the setting unit.

5. The image forming apparatus according to claim 1, wherein
    the data management unit sets processing to automatically execute printing of the time designation invalid print job when printing is enabled as the processing corresponding to the print disabled state.

6. A computer program product comprising a non-transitory computer-usable medium having computer-readable program codes embodied in the medium for image forming in an image forming apparatus, and the program codes when executed causing a computer to execute:
    receiving a print job;
    generating drawing data from print data of the print job;
    image forming that includes forming image based on the drawing data onto a recording medium; and
    data managing that includes,
        causing, when the print job received at the receiving is analyzed to be a time designated print job,
            generating the drawing data,
            causing a data saving unit to save the drawing data in a manner correlated with print conditions such as a designated print time acquired from the print job and the drawing data, and
            managing the designated print time;
        causing, when analyzed that printing is enabled at the designated print time, an image forming unit to perform image formation based on the drawing data at the designated print time and
            causing the log storage unit to store therein a processing log about processing of the image formation; and
        performing, when printing is analyzed to be disabled at the designated print time, processing corresponding to a print disabled state preset for the time designated print job and causing a log storage unit to store therein a processing log about the processing corresponding to the print disabled state.

* * * * *